Oct. 27, 1959  D. N. GOLDBERG  2,910,162
ARTICULATED BRAKE OR CLUTCH ASSEMBLY
Filed June 19, 1956  2 Sheets-Sheet 1

INVENTOR
David N. Goldberg

BY Burns, Doane, Benedict & Deane
ATTORNEYS

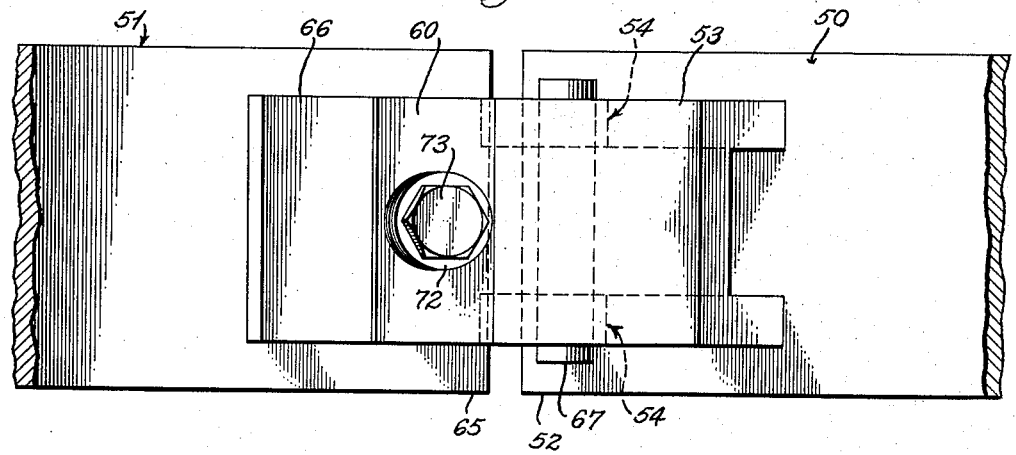
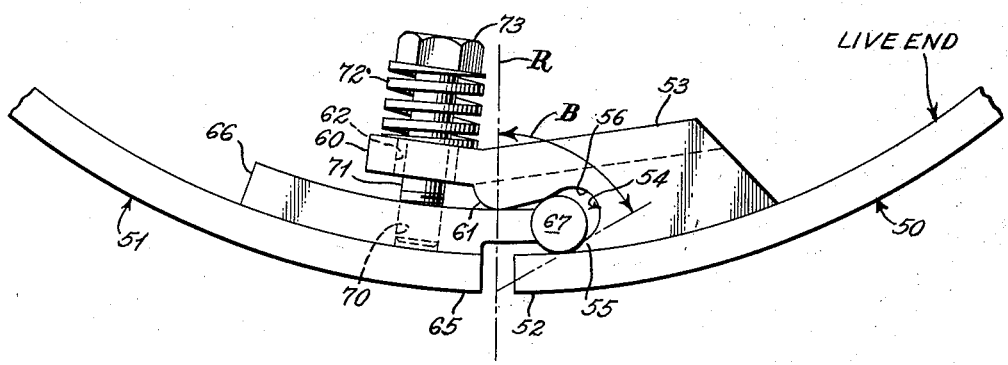

United States Patent Office 2,910,162
Patented Oct. 27, 1959

2,910,162

ARTICULATED BRAKE OR CLUTCH ASSEMBLY

David N. Goldberg, Wheeling, W. Va.

Application June 19, 1956, Serial No. 592,361

6 Claims. (Cl. 192—107)

This invention relates, in its broader aspects, to brake or clutch structures. Specifically, the invention is directed to a brake or clutch friction unit assembly made up of separate arcuate shoe sections interconnected in longitudinal end-to-end relation so that the shoe sections move relative to one another to adjust the assembly to assume a curvature substantially corresponding with the arc of curvature of the drum as the assembly is moved into frictional engagement with a brake or clutch drum.

Brake shoe structures, which also have utility in some instances in clutching applications, have been the subject of extensive development and experimentation. In prior known structures, one of the basic objectives has been to achieve uniform engagement of the brake lining material with the drum throughout its entire surface area. This uniform engagement ideally is to take place simultaneously at all points on the brake lining and, as additional brake actuating force is applied, such force should ideally be distributed uniformly over the area of the brake lining material. If these theoretically ideal lining engagement conditions are met, hot spots in the lining caused by nonuniform lining engagement may be avoided and consequent cooler operation of the mechanism, less force required to perform the intended braking or clutching operation, and increased life of the friction lining material and drum may be expected. Further, a minimum of vibration of the mechanism is achieved where uniformity of surface engagement and pressure of engagement of the friction material with the drum is present.

One characteristic which may be noted with respect to the force of engagement with which the friction lining material is urged against the drum in ordinary semi-rigid brake shoe or band mechanisms, is the fact that such arcuate semi-rigid shoes tend to apply greater lining engagement pressure adjacent the dead end of the brake shoe under a combined self-energizing and levering action about the stationary pin as a fulcrum. In other words, as the brake shoe is actuated to effect a braking operation and such shoe pivots about the stationary pin at the dead end of the shoe, the lining material adjacent such dead end of the shoe initially engages the drum prior to engagement of the rest of the lining material; whereupon rotation of the drum tends, in effect, to wrap the primary shoe into engagement with the drum, resulting in maximum lining engagement pressure occurring adjacent the dead end of the shoe. It will be readily appreciated that, in such a situation, the lining cannot be expected to wear uniformly, but will wear faster at the dead end of the shoe than adjacent the live end. If the stationary pin is moved away from the drum in an attempt to correct for this excess pressure adjacent the dead end of the shoe, the maximum pressure may develop adjacent the live end of the shoe without making use of the self-energizing action and reducing the area of lining in drum contact. Similarly, with rigid arcuate shoes, the pressure of lining engagement with the drum is not uniform, but is concentrated at the center or toward the live end, since the fixed arc shoe, of a smaller arc diameter than its drum, forms a lever which pivots about the anchor pin to move the lining into drum engagement without its being able to adjust to drum diameter or compensate for lining wear. This lack of uniform pressure of engagement invites the production of hot spots and overheating of the brake mechanism as a whole.

In the development of the instant invention, obtaining the above discussed objectives in a brake or clutch structure is brought about by interconnecting arcuate shoe sections so that the shoe sections may pivot relative to one another. Along with this pivotal movement, the interconnection provides an inherent camming action wherein the pivotally interconnected ends of the shoe sections move longitudinally toward one another as the actuating force is applied to the friction unit assembly, and in this movement, through the provision of an inclined camming surface, relative movement between the shoe section ends, in a direction radially of the arc of curvature of the shoe sections, is obtained. As actuating force is applied, the shoe sections which are normally retained by a spring biasing means in a position out of engagement with the drum pivot with respect to one another, and, along with the camming action, the assembly adjusts to closely approximate the arc of curvature of the drum as it engages the drum.

As a feature of the subject invention, the camming action brought about by the structure of the interconnection of the arcuate shoe sections enables the shoe section adjacent the live end of the friction unit assembly to take over some of the force which would normally urge the lining of the dead end shoe section into engagement with the drum under excessive pressure and distribute this pressure more uniformly over the lining carried by the shoe sections adjacent the live end where the actuating force is applied.

With the above general outline of the problems in this field and manner of solution embodied in the instant invention, it is a primary object of this invention to provide a friction unit assembly adapted to be selectively engaged with a drum wherein separate arcuate shoe sections are interconnected by an improved structure so that the maximum area of brake lining material on the assembly will be applied uniformly to the braking surface of the drum with substantially uniform pressure being applied per unit area of brake lining material.

Another object of this invention is to provide a sectionalized friction unit assembly made up of arcuate shoe sections interconnected in longitudinal end-to-end relation for combined pivotal and longitudinal sliding movement relative to one another with such sliding movement involving a camming action which effects movement of the end of one shoe radially relative to the other for uniform distribution of braking force in engaging the lining with the drum.

It is a further object of this invention to provide a friction unit assembly comprised of arcuate shoe sections interconnected in longitudinal end-to-end relation to be pivotal relative to one another and wherein the end of one shoe section is cammed radially relative to the adjoining end of the other shoe section by the provision of an inclined wall surface in the shoe section interconnecting means, which surface is disposed at a predetermined angle of inclination to positively fix the rate of camming action obtained as actuating force is applied to the assembly.

As a more specific object of this invention, the friction unit assembly incorporates spring biasing means together with stop means which limit the extent of pivotal movement between the shoe sections and also urges the pivotal interconnection to assume a position relative to an inclined camming surface incorporated in the shoe section interconnecting means so that the assembly is retained in condition to have the shoe sections pivoted and cammed relative to each other by the application of brake or clutch energizing force to the live end of the assembly.

Having the above objects in mind, and other objects of the invention which will become apparent by reference to the detailed description given hereinafter with respect to the illustrated embodiments of this invention, reference will now be had to the drawings which form a part of this application.

In the drawings:

Figure 3 is a plan view illustrating a slightly modified embodiment of shoe section interconnecting means in a friction unit assembly of the instant invention, and Figure 4 is a side elevational view of the structure of Figure 3.

Figure 1:
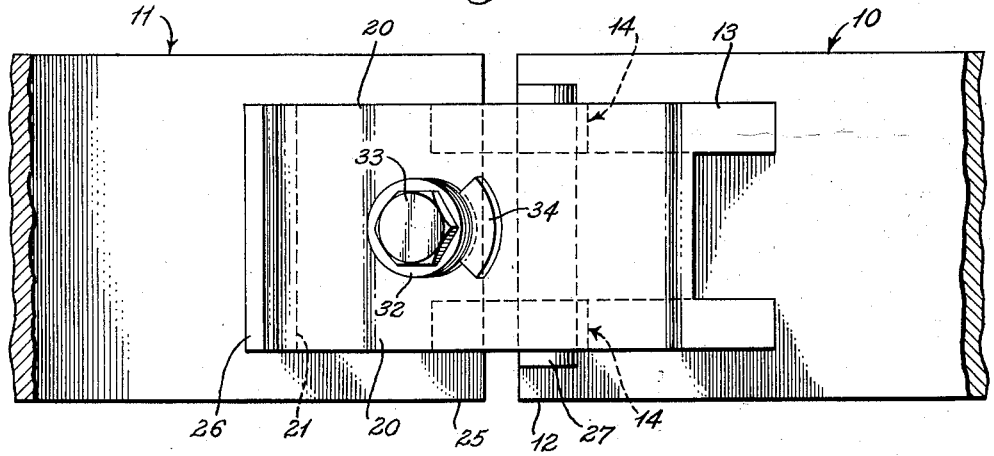
Figure 1 is a plan view illustrating details of the shoe section interconnecting means in the friction unit assembly of the instant invention.

Initially, it may be pointed out that the figures on the drawings illustrate the salient features of the means employed in the interconnection of separate arcuate shoe sections which make up the friction unit assembly of the instant invention. No attempt has been made in the drawings to illustrate details of the various means which may be employed in anchoring the friction unit assembly to form one end of the assembly into the dead end or of the various force applying mechanisms which may be employed in connection with the friction unit assembly of this invention to effect actuation in a braking or clutching operation. The details of such end anchoring devices for the dead end of the assembly and force applying mechanisms as used at the live end of the assembly may take a variety of different forms which form no part of the instant invention. It is, of course, to be recognized that it is contemplated that in carrying into practice the teachings of the invention described herein, one end of the friction unit assembly will be anchored by a suitable means which will form this end into the dead end of the assembly, and the other end will be connected to a suitable mechanism for applying brake actuating force to form such end of the assembly into the live end. It may also be pointed out at this point that, whereas a single interconnection between two arcuate shoe sections has been illustrated in detail, the complete assembly may be made up of two or more arcuate shoe sections interconnected by the means as disclosed and described in detail hereinafter.

Figure 2:
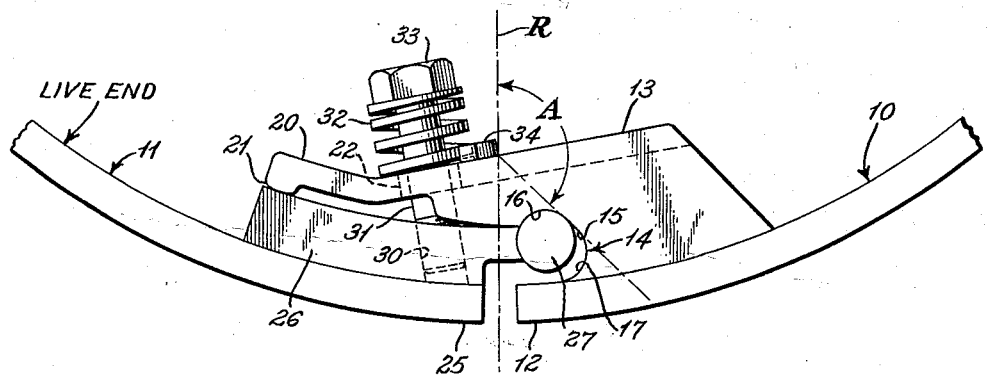
Figure 2 is a side elevational view of the structure shown in Figure 1.

Referring now to Figures 1 and 2, there is shown thereon in plan and side elevation, respectively, a structure embodying the features of this invention for interconnecting arcuate shoe sections 10 and 11. It will, of course, be understood that the outermost surfaces of shoe sections 10 and 11 are to have attached thereto suitable friction lining material (not shown).

The end 12 of shoe section 10 has rigidly secured thereto a connecting member 13 provided with an elongated socket 14. The connecting member 13 is so mounted on the end 12 of shoe section 10 that socket 14 provides a pivot axis which is disposed transversely of the end 12 and which receives, as will be described, a connecting pin member carried by the adjoining end of the next adjacent shoe section.

Socket 14 is elongated in a direction generally normal to the pivot axis which it provides and has a wall 15 which is inclined at angle A with respect to the radius of curvature R which intersects the junction between the ends of shoe sections 10 and 11. The inclined wall 15 provides a camming surface against which the heretofore referred to connecting pin member slides in the braking or clutching operation effected by utilization of the friction unit assembly of this invention. As specifically shown in Figure 2, the ends of socket 14 are formed by cylindrical surfaces 16 and 17 with which the ends of inclined wall 15 are tangent.

Connecting member 13 further has an arm 20 extending outwardly from the end 12 of shoe section 10, which arm is provided with a stop element 21. In the assembled relation of shoe sections 10 and 11, as shown in Figures 1 and 2, the arm 20 overlies the end of shoe section 11, and the stop element 21 limits relative pivotal movement between the shoe sections. An aperture 22 is provided, extending through arm 20 to receive the stud of the spring biasing means, as will be described in detail hereinafter.

Shoe section 11 carries on its end 25 a mounting 26 rigidly secured to the shoe section end and having a connecting pin member 27 with its axis disposed transversely of the end 25 of shoe section 11. Connecting pin member 27 is engaged with socket 14 of connecting member 13 to pivotally interconnect shoe sections 10 and 11 in longitudinal end-to-end relation. The assembly of the shoe sections 10 and 11 may readily be effected by sliding connecting pin member 27 endwise into socket 14 as by moving the end 25 of shoe section 11 transversely to the end 12 of shoe section 10 until the two shoe sections are positioned as shown in the plan view of Figure 1.

As shown in Figure 2, mounting 26 is provided with a tapped bore 30 which has threaded thereinto a bolt 31. The shank of bolt 31 extends, in the assembled relationship of the shoe sections, outwardly through aperture 22 and has a compression spring 32 engaged between bolt head 33 and the upper surface of arm 20 of connecting member 13. A spring centering guide 34 may be provided secured to the upper surface of arm 20 to maintain spring 32 in proper desired relation to the shank of bolt 31. It will be noted that the axis of bolt 31 is inclined relative to radius R to assist in the functioning of spring 32, as described below.

The spring biasing means formed by compression spring 32 acting between the head 33 of bolt 31 and the upper surface of arm 20 in effect performs a dual function. First, it will be appreciated that the compressive force of spring 32 acts against arm 20, urging its stop element 21 into engagement with the upper surface of mounting 26. As stop element 21 moves into engagement with mounting 26, the shoe sections 10 and 11 pivot with respect to each other about connecting pin member 27 engaged within socket 14.

Spring 32 also tends to draw connecting pin member 27 upwardly, as shown in Figure 2, within socket 14 through the action of the spring on bolt 31. In this action, the incline of the axis of bolt 31 further assists in the force of spring 32 moving connecting pin member 27 upwardly along inclined wall 15 of socket 14.

The spring biasing force to be overcome in the braking operation as provided by spring 32 may be readily adjusted to suit particular circumstances by threading bolt 31 into or out of tapped bore 30 to alter the magnitude of compressive force provided by spring 32.

It will be seen that, in its unactuated state, that is, where brake force is not being applied to the live end of the friction unit assembly, the elements will assume the position as shown in Figure 2, that is, stop element 21 will be engaged with the upper surface of mounting 26 and connecting pin member 27 will lie at the radially innermost portion of socket 14 in engagement with cylindrical wall portion 16 of the socket at the top of inclined wall 15. Upon the application of brake or clutch actuating force to the live end, which, as shown in Figure 2, may be shoe section 11, shoe section 11 will tend to pivot with respect to shoe section 10 about connecting pin member 27 as the two shoe sections move towards a larger arc of curvature and thus toward engagement with the brake or clutch drum. It will be appreciated that the brake or clutch drum will have an arc of curvature larger than the contracted curvature of the friction unit assembly in its unactuated state, as shown in Figure 2.

Along with the pivoting action which takes place between shoe sections 10 and 11 when brake applying force is asserted to the live end of the assembly, there will be a movement of end 25 of shoe section 11 toward end 12 of shoe section 10 by reason of the force applied longitudinally along the arc of shoe section 11 from the force applying mechanism at the live end. This movement will result in connecting pin member 27 being urged in opposition to the force of spring 32 along the inclined wall 15, whereupon end 12 of shoe section 10 will be moved radially inwardly with respect to end 25 of shoe section 11. As such takes place, the excess lining engagement pressure on the dead end shoe section 10, as may be encountered in conventional brake shoe mechanisms, is transferred from shoe section 10, by its being in effect cammed away from the brake drum, to shoe section 11, which is urged by this camming action toward the brake drum. Accordingly, a more effective and uniform distribution of the lining engagement pressure, as developed from the force applied by the mechanism at the live end of the assembly, is obtained.

Upon release of the force applied through the brake applying mechanism, the spring 32 will return the shoe sections to their positions, as shown in Figure 2, preparatory to the next succeeding application of the brake or clutch operating force.

In Figures 3 and 4, there is shown a further embodiment incorporating the features of the friction unit assembly of this invention. In these figures, arcuate shoe sections 50 and 51 are interconnected in longitudinal end-to-end relation similar to that described in connection with the embodiment of Figures 1 and 2.

The end 52 of shoe section 50 has mounted thereon a connecting member 53 which has an elongated socket 54 formed therein to provide a pivot axis disposed transversely of shoe section 50. As in the case of the socket of the previously described embodiment, socket 54 has one wall 55 inclined at angle B with respect to the radius of curvature R which intersects the junction between the ends of shoe sections. The innermost end of socket 54 is formed by cylindrical wall portion 56 with which the upper end of inclined wall 55 is tangent.

Connecting member 53 has an arm 60 extending outwardly from the end 52 of shoe section 50 and provided with a stop element 61 which serves to limit relative pivotal movement between the shoe sections 50 and 51. An aperture 62 is provided in arm 60 to receive the shank of the bolt which forms a part of the spring biasing means as described below.

The end 65 of shoe section 51 has a mounting 66 which carries a connecting pin member 67 which is received in socket 54 of connecting member 53. As in the case of the previously described embodiment, the elements are assembled by sliding pin member 67 endwise into socket 54 until the shoe sections 50 and 51 are positioned as shown in Figure 3.

A tapped bore 70 is provided in mounting 66 and a bolt 71 threaded thereinto. The shank of this bolt extends through aperture 62 and has a compression spring 72 mounted between bolt head 73 and the upper surface of arm 60. Adjustment of the magnitude of the force applied by spring 72 may be made as desired by threading bolt 71 into and out of tapped bore 70.

If it be assumed, merely by way of example, that arcuate shoe section 50 is connected to receive force from the actuating mechanism of the brake or clutch and thus is the live end of the assembly, shoe section 51 will extend toward the dead end or stationary end of the brake or clutch structure. In the unactuated state of the assembly, the elements will assume the position shown in Figure 4. Thus, spring 72 urges arm 60 toward the end 65 of shoe section 51 to pivot the two shoe sections to the minimum arc as limited by engagement of stop element 61 with the upper surface of mounting 66. By reason of the location of stop element 61 in the structure, as shown in Figure 4, intermediate socket 54 and the spring biasing means, the spring 72 will also tend to draw shoe section 51 upwardly and move connecting pin member 67 downwardly along inclined wall 55 to the radially outermost portion of elongated socket 54. It will be appreciated that this action will take place when stop 61 engages the top of mounting 66, whereupon spring 72 continues to urge the shoe sections 50 and 51 toward a retracted position and pin member 67 slides down to the bottom or radially outermost portion of socket 54.

When actuating force is applied through shoe section 50, the shoe sections 50 and 51 tend to pivot about pin member 67 in opposition to spring 72, and longitudinal movement of shoe section 50 toward shoe section 51 takes place with pin member 67 sliding upwardly into socket 54 along inclined wall 55. Thereupon, end 65 of shoe section 51 is moved radially inwardly relative to end 52 of shoe section 50. Here, again, transfer of lining engagement pressure from one shoe section to the other is effected to give, as an end result, more uniform pressure of engagement throughout the entire surface of the lining. Upon release of the actuating force, spring 72 returns the elements to the position as shown in Figure 4.

Generally, the magnitude of angle A in the embodiment of Figure 2 and angle B in Figure 4 is determined by the particular size diameter drum with which the friction unit assembly is to be employed, and also by the type of actuator provided at the live end by means of which actuating force is applied to the assembly. Thus, for smaller diameter drums, the inclination would generally be steeper than the inclination of walls 15 and 55 for friction unit assemblies constructed for use with larger diameter drums. Accordingly, angle A will be larger or angle B smaller in a friction unit assembly to be used with relatively small diameter drums in comparison with the magnitude of these angles as employed in friction unit assemblies for relatively large diameter drums. The other factor taken into consideration in setting the inclination of camming surfaces 15 or 55 relates to the nature or type of live end actuator. Where the particular acuator mechanism can deliver relatively low actuating force tangentially along the arc of the shoe sections, a lesser degree of inclination of the camming surface is dictated. Similarly, where greater actuating force can be applied by the particular type of live end actuator, a greater inclination of the camming surface is to be used. As a practical matter, it has been found that an inclination of about 35 degrees is effective in conjunction with the friction unit assembly of this invention, this angle being measured as the angle which inclined wall 15 or 55 forms with a tangent to the arc of the assembly at the junction of the two interconnected shoe sections.

The present application is a continuation-in-part and relates to an improvement on the invention of my copending application entitled "Variable Arc Braking Device," filed January 26, 1954, Serial No. 406,104 and now Patent Number 2,778,470.

I claim:

1. In a brake or clutch structure, a friction unit assembly adapted to be selectively engaged with a drum comprising first and second arcuate shoe sections, a connecting member carried at one end of said first shoe section and having a socket formed therein to provide a pivot axis disposed transversely of the end of the said first shoe section, an arm extending outwardly from the end of said first shoe section and having stop means thereon, a connecting pin member carried at one end of said second shoe section and having its axis disposed transversely of the end of said second section, said connecting pin member being engaged with said socket to pivotally interconnect said shoe sections in end-to-end relation with said arm overlying the end of said second shoe section so that the extent of pivotal movement between said shoe sections will be limited by said stop means, said socket being elongated in a direction generally normal to said pivot axis and provided with one wall thereof inclined at a predetermined angle with respect to the radius of curvature of said arcuate shoe sections which intersects the junction between the ends of said sections.

2. In a brake or clutch structure, a friction unit assembly adapted to be selectively engaged with a drum comprising first and second arcuate shoe sections, a connecting member carried at one end of said first shoe section and having a socket formed therein to provide a pivot axis disposed transversely of the end of said first shoe section, an arm extending outwardly from the end of said first shoe section and having stop means thereon, a connecting pin member carried at one end of said second shoe section and having its axis disposed transversely of the end of said second section, said connecting pin member being engaged with said socket to pivotally interconnect said shoe sections in end-to-end relation with said arm overlying the end of said second shoe section so that the extent of pivotal movement between said shoe sections will be limited by said stop means, and spring biasing means urging said shoe sections to pivot to the position limited by said stop means, said socket being elongated in a direction generally normal to said pivot axis and provided with one wall thereof inclined at a predetermined angle with respect to the radius of curvature of said arcuate shoe sections which intersects the junction between the ends of said sections.

3. In a brake or clutch structure, a friction unit assembly adapted to be selectively engaged with a drum comprising first and second arcuate shoe sections, a connecting member carried at one end of said first shoe section and having a socket formed therein to provide a pivot axis disposed transversely of the end of said first shoe section, an arm extending outwardly from the end of said first shoe section and having stop means thereon, a connecting pin member carried at one end of said second shoe section and having its axis disposed transversely of the end of said second section, said connecting pin member being engaged with said socket to pivotally interconnect said shoe sections in end-to-end relation with said arm overlying the end of said second shoe section so that pivotal movement between said shoe sections will be limited by said stop means, said socket being elongated in a direction generally normal to said pivot axis and provided with one wall thereof inclined at a predetermined angle with respect to the radius of curvature of said arcuate shoe sections which intersects the junction between the ends of said sections to move the end of said first arcuate shoe section radially inwardly relative to the end of said second shoe section upon engaging force being applied to said friction unit assembly, and spring biasing means urging said shoe sections to pivot to the position limited by said stop means and said pin member to move along said inclined wall to the radially innermost portion of said socket.

4. In a brake or clutch structure, a friction unit assembly adapted to be selectively engaged with a drum comprising first and second arcuate shoe sections, a connecting member carried at one end of said first shoe section and having a socket formed therein to provide a pivot axis disposed transversely of the end of said first shoe section, an arm extending outwardly from the end of said first shoe section and having stop means thereon, a connecting pin member carried at one end of said second shoe section and having its axis disposed transversely of the end of said second section, said connecting pin member being engaged with said socket to pivotally interconnect said shoe sections in end-to-end relation with said arm overlying the end of said second shoe section so that the extent of pivotal movement between said shoe sections will be limited by said stop means, said socket being elongated in a direction generally normal to said pivot axis and provided with one wall thereof inclined at a predetermined angle with respect to the radius of curvature of said arcuate shoe sections which intersects the junction between the ends of said sections to move the end of said first shoe section radially outwardly relative to the end of said second shoe section upon engaging force being applied to said friction unit assembly, and spring biasing means urging said shoe sections to pivot to the position limited by said stop means and said pin member to move along said inclined wall to the radially outermost portion of said socket.

5. In a brake or clutch structure, a friction unit assembly adapted to be selectively engaged with a drum comprising first and second arcuate shoe sections, a connecting member on one end of said first shoe section to be movable therewith and having a socket formed therein to provide a pivot axis disposed transversely of the end of said first shoe section, a connecting pin member on one end of said second shoe section to be movable therewith and having its axis disposed transversely of the end of said second section, said connecting pin member being engaged with said socket to pivotally interconnect said sections in end-to-end relation for free pivoting movement relative to each other in a plane including the arcs of said sections, said socket being elongated along a line generally normal to said pivot axis, said line of elongation intersecting a radius of curvature of said arcuate shoe sections extending through said pivot axis and being inclined at a predetermined acute angle with respect to said radius of curvature.

6. In a brake or clutch structure, a friction unit assembly adapted to be selectively engaged with a drum comprising first and second arcuate shoe sections, a connecting member on one end of said first shoe section to be movable therewith and having a socket formed therein to provide a pivot axis disposed transversely of the end of said first shoe section, said socket being disposed radially inwardly of and overlying a portion of said first shoe section which carries friction lining material, a connecting pin member on one end of said second shoe section to be movable therewith and having its axis disposed transversely of the end of said second section, said connecting pin member being engaged with said socket to pivotally interconnect said shoe sections in end-to-end relation for free pivoting movement relative to each other in a plane including the arcs of said sections, said socket being elongated along a line generally normal to said pivot axis, said line of elongation intersecting a radius of curvature of said arcuate shoe sections extending through said pivot axis and being inclined at a predetermined acute angle with respect to said radius of curvature.

References Cited in the file of this patent

UNITED STATES PATENTS

| | | |
|---|---|---|
| 1,851,357 | Gunn | Mar. 29, 1932 |
| 2,287,023 | Carnes | June 23, 1942 |